US008992634B2

(12) United States Patent
Kubotera et al.

(10) Patent No.: US 8,992,634 B2
(45) Date of Patent: Mar. 31, 2015

(54) METHOD FOR DYEING PLASTIC LENS (75) Inventors: Takaaki Kubotera, Tokyo (JP); Hiroshi Futami, Tokyo (JP); Shinya Miyajima, Tokyo (JP)

(73) Assignee: Hoya Corporation, Tokyo (JP)

( * ) Notice: Subject to any disclaimer, the term of this patent is extended or adjusted under 35 U.S.C. 154(b) by 469 days.

(21) Appl. No.: 12/845,635

(22) Filed: Jul. 28, 2010

(65) Prior Publication Data

US 2011/0023243 A1     Feb. 3, 2011

(30) Foreign Application Priority Data

Jul. 31, 2009  (JP) ................................. 2009-179281
Jul. 9, 2010   (JP) ................................. 2010-156739

(51) Int. Cl.
| | |
|---|---|
| *D06P 5/28* | (2006.01) |
| *G02B 1/04* | (2006.01) |
| *B29D 11/00* | (2006.01) |
| *G02B 1/10* | (2006.01) |

(52) U.S. Cl.
CPC ............... *D06P 5/004* (2013.01); *G02B 1/041* (2013.01); *D06P 5/006* (2013.01); *G02B 1/043* (2013.01); *B29D 11/00903* (2013.01); *G02B 1/10* (2013.01)
USPC ....................................... 8/507; 8/471; 8/506

(58) Field of Classification Search
USPC .............................................................. 8/471
See application file for complete search history.

(56) References Cited

U.S. PATENT DOCUMENTS

| | | | |
|---|---|---|---|
| 5,560,751 A | 10/1996 | Hoshiyama | |
| 6,520,999 B1 * | 2/2003 | Kamata et al. ..................... | 8/471 |
| 7,014,314 B1 | 3/2006 | Kamata et al. | |
| 2001/0014988 A1 * | 8/2001 | Inuzuka ........................... | 8/506 |

FOREIGN PATENT DOCUMENTS

| | | | |
|---|---|---|---|
| JP | 2001-059950 A | | 3/2001 |
| JP | 2001059950 A | * | 3/2001 |
| JP | 2001-215306 A | | 8/2001 |
| JP | 2004-052160 A | | 2/2004 |

(Continued)

OTHER PUBLICATIONS

English language abstract of JP 2001-059950 A to Kamata et al., accessed in JPO and published on Mar. 6, 2001.*

(Continued)

*Primary Examiner* — Lorna M Douyon
*Assistant Examiner* — Katie L Hammer
(74) *Attorney, Agent, or Firm* — Blakely Sokoloff Taylor & Zafman (57) ABSTRACT

A method of dyeing a plastic lens including applying a sublimation dye to a dyeing substrate, holding the dyeing substrate on a holding member, holding a plastic lens on the holding member at a position above the dyeing substrate, evacuating a vacuum vessel which accommodates the holding member, transferring the dyeing substrate from the holding member to a heating device provided in the vacuum vessel, so that the dyeing substrate is held to be heatable by the heating device, by vertically moving at least one of the holding member and the heating device, bringing the plastic lens in close proximity to the dyeing substrate by vertically moving at least one of the holding member and the heating device which holds the dyeing substrate, and dyeing the target surface of the plastic lens with the sublimation dye by sublimating the sublimation dye by heating the dyeing substrate using the heating device.

6 Claims, 4 Drawing Sheets

(56) References Cited

FOREIGN PATENT DOCUMENTS

| | | |
|---|---|---|
| JP | 2004-069905 A | 3/2004 |
| JP | 2005-025130 A | 1/2005 |

OTHER PUBLICATIONS

English machine translation of JP 2001-059950 A to Kamata et al., accessed online from AIPN translator on Apr. 19, 2012.*

* cited by examiner

METHOD FOR DYEING PLASTIC LENS

BACKGROUND OF THE INVENTION

The present invention relates to a method and apparatus for dyeing a plastic lens with a sublimation dye.

With various kinds of dyeing methods (vapor phase methods) having conventionally been proposed, a plastic lens and, especially, plastic lenses for spectacle lenses are dyed with a sublimation dye by heating and sublimating the sublimation dye. Details of these various kinds of dyeing methods are disclosed in, for example, references 1 to 4.

In the method of dyeing a plastic lens described in reference 1, a dyeing material is applied to a print medium, and the print medium is heated in a vacuum while being opposed to the plastic lens. The dyeing material is obtained by dissolving a sublimation colorant or dispersing it as fine particles, and is applied to a print substrate by a printer based on color data managed by an electronic calculator. The print substrate is heated by a heating means while its coated surface is opposed to the plastic lens in a noncontact state. The sublimation colorant sublimates upon heating the print substrate in a vacuum.

In the method of dyeing a plastic lens described in reference 2, the plastic lens and dyeing substrates are held in an apparatus by a holding means, and the two surfaces of the plastic lens are dyed at once. The dyeing substrates are coated with a dyeing material obtained by dissolving a sublimation colorant or dispersing it as fine particles. These substrates are opposed to the convex and concave surfaces of the plastic lens by first and second opposing means, respectively. The first opposing means opposes the coated surface of one substrate to the convex surface of the plastic lens in a noncontact state. The second opposing means opposes the coated surface of the other substrate to the concave surface of the plastic lens in a noncontact state. The substrates opposed to the plastic lens by these first and second opposing means are heated by a heating means. This heating takes place after the apparatus is evacuated into an almost vacuum atmosphere by an exhaust device.

In the method of dyeing a plastic lens described in reference 3, an apparatus is cooled so that the color reproducibility stabilizes. A dyeing apparatus which performs this method includes a dyeing substrate, vacuum atmosphere forming means, heating means, and cooling means. The substrate is coated with a sublimation dye, and placed in the dyeing apparatus. The vacuum atmosphere forming means evacuates the dyeing apparatus into an almost vacuum atmosphere. The heating means is placed in the dyeing apparatus, and heats the substrate. The cooling means is in contact with the outer wall of the dyeing apparatus, and cools the dyeing apparatus by heat exchange in the contact portion between the cooling means and that outer wall.

In the method of dyeing a plastic lens described in reference 4, at least one of the plastic lens and a holding member which holds a sublimation dye is rotated or vibrated during heating. The adoption of this method allows the plastic lens to be evenly dyed free from any variation. The holding member is heated by a heating member, and the plastic lens is heated by a lens temperature controller.

[Reference 1] Japanese Patent Laid-Open No. 2001-59950
[Reference 2] Japanese Patent Laid-Open No. 2001-215306
[Reference 3] Japanese Patent Laid-Open No. 2004-69905
[Reference 4] Japanese Patent Laid-Open No. 2005-25130

In the dyeing apparatuses described in references 1, 3, and 4 each, because the lens and the dyeing substrate are separately arranged in the vacuum device, their loading/unloading is so cumbersome as to require a considerable time. Also, the dyeing apparatuses described in these references each require a mechanism or means for adjusting the interval between the lens and the dyeing substrate.

In the dyeing apparatus described in reference 2, because the intervals between the print substrates and the lens are fixed, an appropriate adjusting means is necessary to change these intervals.

SUMMARY OF THE INVENTION

It is an object of the present invention to provide a method and apparatus for dyeing a plastic lens, which are simple and can easily load/unload a dyeing substrate and a lens.

In order to achieve the above-mentioned object, according to an aspect of the present invention, there is provided a method of dyeing a plastic lens, comprising the steps of applying a sublimation dye to a dyeing substrate, holding the dyeing substrate on a holding member, holding a plastic lens on the holding member at a position above the dyeing substrate, evacuating a vacuum vessel which accommodates the holding member, transferring the dyeing substrate from the holding member to a heating device provided in the vacuum vessel, so that the dyeing substrate is held to be heatable by the heating device, by vertically moving at least one of the holding member and the heating device, bringing the plastic lens in close proximity to the dyeing substrate by vertically moving at least one of the holding member and the heating device which holds the dyeing substrate, and dyeing a target surface of the plastic lens with the sublimation dye by sublimating the sublimation dye by heating the dyeing substrate using the heating device.

According to another aspect of the present invention, there is provided an apparatus for dyeing a plastic lens in vapor phase in a vacuum vessel, comprising a holding member which holds an outer edge of a dyeing substrate having a surface coated with a sublimation dye, and holds the plastic lens at a position above the dyeing substrate, a heating device which has a heating surface opposed to a central portion, inside the outer edge, on a lower surface of the dyeing substrate, a lift mechanism which vertically moves at least one of the holding member and the heating device, the holding member, the heating device, and the lift mechanism being accommodated in the vacuum vessel, and a controller which controls operations of the heating device and the lift mechanism, wherein the lift mechanism vertically moves at least one of the holding member and the heating device so that the dyeing substrate is transferred from the holding member to the heating device, thereby being held to be heatable by the heating device, and the dyeing substrate held by the heating device comes in close proximity to the plastic lens.

DESCRIPTION OF THE PREFERRED EMBODIMENTS

First Embodiment

The present invention will be described in detail below with reference to the accompanying drawings.

Figure 1:
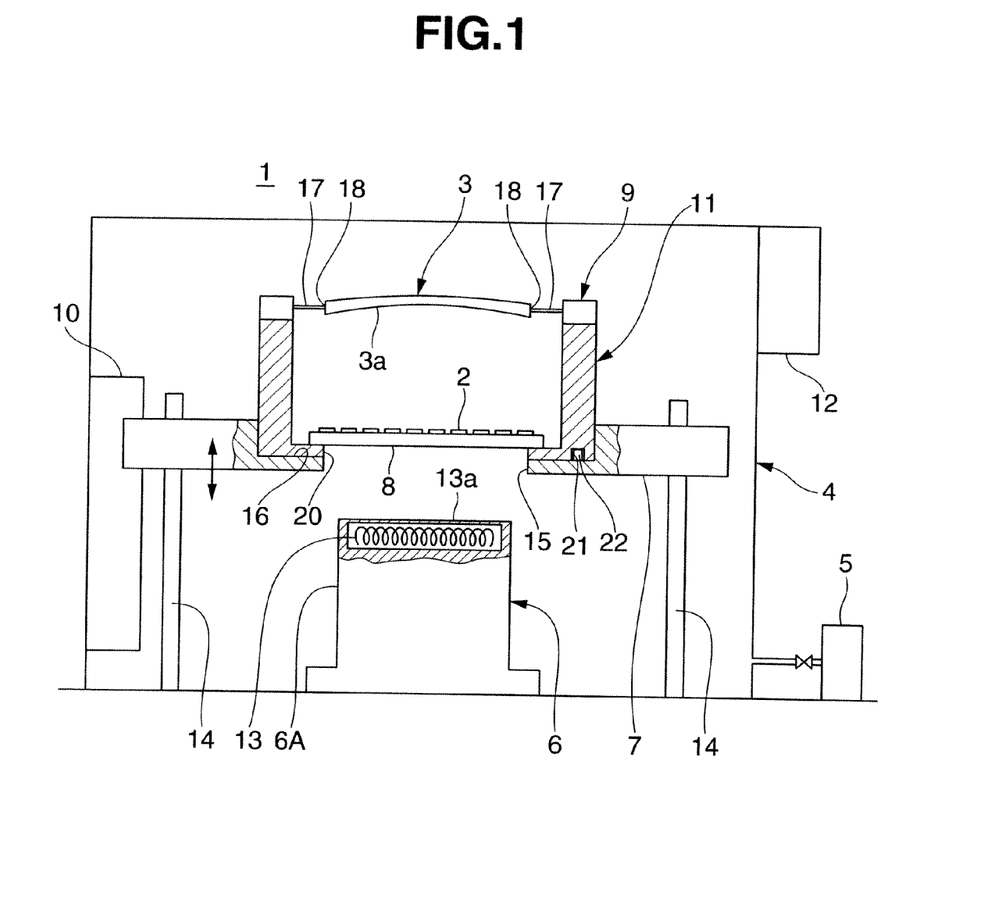
FIG. 1 is a schematic configuration diagram showing the state of a dyeing apparatus according to the present invention immediately before dyeing in one embodiment.
Figure 2:
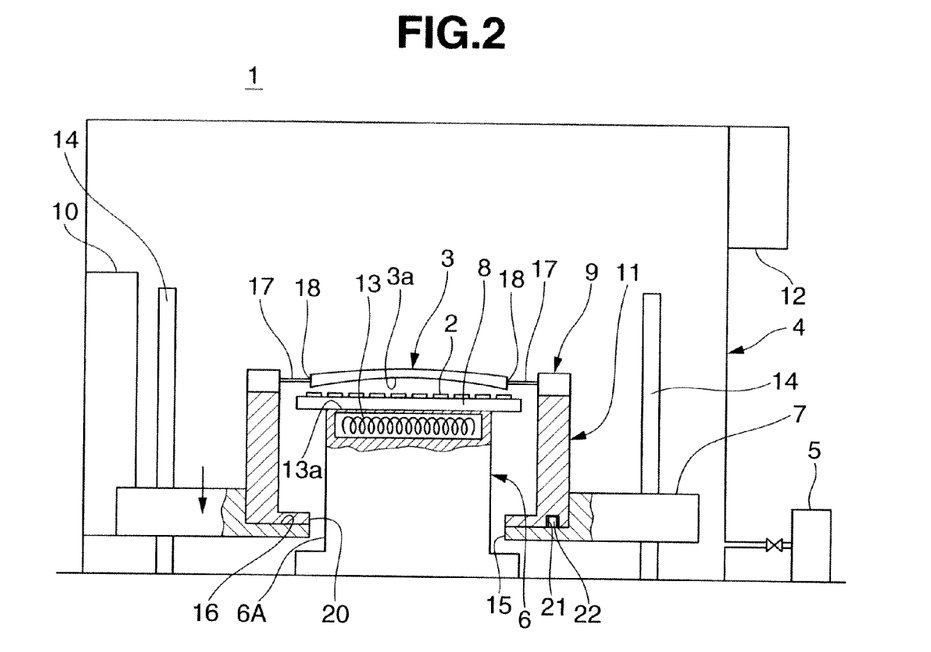
FIG. 2 is a schematic configuration diagram showing the state at the start of dyeing.
Figure 3:
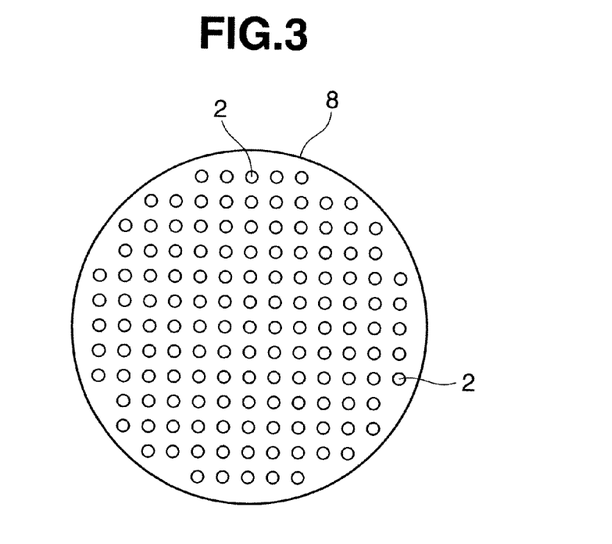
FIG. 3 is a plan view of a dyeing substrate.

Referring to FIGS. 1 to 3, a dyeing apparatus 1 applies a sublimation dye 2 to a target surface 3a of a plastic lens 3. The dyeing apparatus 1 includes, e.g., a vacuum vessel 4, an exhaust device 5 which exhausts air from the vacuum vessel 4 to a predetermined degree of vacuum, a heating device 6 disposed in the vacuum vessel 4, a movable stage 7, a dyeing substrate 8, a holder 9 to which the plastic lens 3 is attached, a lift mechanism 10 for the movable stage 7, a holding member 11, and a controller 12 which controls the overall apparatus and a dyeing process.

The sublimation dye 2 need only be a dye which sublimates upon being heated in the atmosphere or in a vacuum. The sublimation dye 2 can be a commercial product such as Kayaset Blue 906 (available from Nippon Kayaku), Kayaset Brown 939 (available from Nippon Kayaku), Kayaset Red 130 (available from Nippon Kayaku), Kayalon Microester Red C-LS conc (available from Nippon Kayaku), Kayalon Microester Red AQ-LE (available from Nippon Kayaku), Kayalon Microester Red DX-LS (available from Nippon Kayaku), Dianix Blue AC-E (available from Dystar Japan), Dianix Red AC-E 01 (available from Dystar Japan), Dianix Yellow AC-E new (available from Dystar Japan), Kayalon Microester Yellow C-LS (available from Nippon Kayaku), Kayalon Microester Yellow AQ-LE (available from Nippon Kayaku), Kayalon Microester Blue C-LS conc (available from Nippon Kayaku), Kayalon Microester Blue AQ-LE (available from Nippon Kayaku), or Kayalon Microester Blue DX-LS conc (available from Nippon Kayaku).

Various kinds of application methods can be used to apply the sublimation dye 2 to the dyeing substrate 8. In the present invention, the sublimation dye 2 is applied by dropping to the surface of the dyeing substrate 8 in large quantities so as to scatter in a dot pattern by a commercially available dispenser device. The size (the amount of application) of the dotted sublimation dye 2 applied by dropping can be freely adjusted in accordance with the amount of discharge from a nozzle. When this size is defined by the diameter per dot and the dot interval (the interval between dots of the sublimation dye), the former preferably is about 1 mm to 10 mm and more preferably is 2 mm to 6 mm, and the latter preferably is about 1 mm to 10 mm. The dot size can be changed in accordance with the dyeing density. Also, the dot size need not always be the same over the entire dotted sublimation dye 2, and may be gradually changed in accordance with the characteristics of the curve of the target surface 3a or half dyeing (gradation dyeing).

Although glass is used as the dyeing substrate 8, the present invention is not limited to this, and a metal may be used.

The heating device 6 includes a heater 13 built in a cylindrical external case 6A, and is disposed in the lower portion inside the vacuum vessel 4. The upper surface of the external case 6A forms a flat, circular heating surface 13a. A current resistance heater or a far-infrared heater, for example, can be used as the heater 13.

The movable stage 7 is disposed to be vertically movable on a plurality of guide columns 14 which stand upright in the vacuum vessel 4, and is configured to be lifted/lowered by the lift mechanism 10. A central hole 15 through which the heating device 6 can pass is formed at the center of the movable stage 7. Also, a recess 16 is formed in the upper surface of the movable stage 7 to concentrically surround the central hole 15. The recess 16 is formed such that the lower end of the holding member 11 fits into it. The lift mechanism 10 can take any form as long as it lifts/lowers the movable stage 7. The lift mechanism 10 can be formed using, for example, a linear guide or a pivoting arm.

The holder 9 is formed in a ring shape. Three leaf springs 17 serving as holding means for holding the plastic lens 3 at, for example, three points are cantilevered on the inner peripheral surface of the holder 9. The free ends of the leaf springs 17 each form a pressure holding portion 18. The leaf springs 17 elastically hold by pressure the outer peripheral surface (edge surface) of the plastic lens 3. The holder 9 can also have an arrangement which holds the plastic lens 3 by pressing a plurality of hook grippers (not shown) against the outer peripheral surface of the plastic lens 3.

The holding member 11 is a cylindrical member which has two open ends, an outer diameter nearly equal to the inner diameter of the recess 16 in the movable stage 7, and an inner diameter slightly larger than the outer diameter of the dyeing substrate 8. A mounting portion 20 for holding the dyeing substrate 8 is integrally provided at the lower open end of the holding member 11. The mounting portion 20 is formed from an inner flange. The inner diameter of the mounting portion 20 is set nearly equal to the diameter of the central hole 15, and smaller than the outer diameter of the dyeing substrate 8. That is, the holding member 11 holds the outer edge of the dyeing substrate 8. While the dyeing substrate 8 is held on the holding member 11, the central portion, inside the outer edge of the dyeing substrate 8, on the lower surface of the dyeing substrate 8 is opposed to the heating surface 13a of the heating device 6.

The holder 9 is set on the upper surface of the holding member 11. That is, the plastic lens 3 is held on the holding member 11 at a position above the dyeing substrate 8 by the holder 9.

A procedure for dyeing the plastic lens 3 using the dyeing apparatus 1 with the above-mentioned structure will be described next.

In a dyeing preparation process, the plastic lens 3 is attached to the holder 9 first. In the attachment, the distal ends of the three leaf springs 17 are elastically deformed outward to insert the plastic lens 3 in the middle of the leaf springs 17. In this state, the leaf springs 17 are released to restore them inward by means of elasticity. As a result, the pressure holding portions 18 of the leaf springs 17 press the outer peripheral surface of the plastic lens 3 and hold it at three points.

The sublimation dye 2 is applied by dropping to the surface of the dyeing substrate 8 in large quantities so as to scatter in a dot pattern at a predetermined interval by a dispenser device (not shown). Note that the process of applying the sublimation dye 2 to the dyeing substrate 8, and the process of attaching the plastic lens 3 to the holder 9, may be performed in either order or in parallel.

The dyeing substrate 8 coated with the sublimation dye 2 is attached to the holding member 11. In attaching the dyeing substrate 8 to the holding member 11, the dyeing substrate 8 is mounted on the mounting portion 20 of the holding member 11 with its surface coated with the sublimation dye 2 facing up. The dyeing substrate 8 is mounted on the mounting portion 20 by causing the dyeing substrate 8 to fall by its own weight so that, for example, the outer edge of the lower surface of the dyeing substrate 8 falls onto and is supported by the mounting portion 20. This makes it possible to easily hold the dyeing substrate 8 on the holding member 11.

Furthermore, the holder 9 to which the plastic lens 3 is attached is attached to the upper surface of the holding member 11.

The holding member 11 to which the dyeing substrate 8 and holder 9 are attached is inserted into the vacuum vessel 4 to fit the lower end of the holding member 11 into the recess 16 in the movable stage 7. At this time, a positioning groove 21 provided in the lower surface of the holding member 11, and a projection 22 provided on the bottom surface of the recess 16 are fitted together. By fitting together the positioning groove 21 and projection 22 in this way, the holding member 11 is positioned with respect to the movable stage 7, and the holding member 11 is prevented from rotating. At this time, the movable stage 7 is held at the initial position above the heating device 6, as shown in FIG. 1.

The vacuum vessel 4 is sealed and the exhaust device 5 is driven to evacuate the vacuum vessel 4 to a predetermined degree of vacuum. Also, the heating device 6 is powered on to heat the heater 13, thereby heating the heating surface 13*a* to a predetermined temperature. The temperature of the heating surface 13*a* is detected by a temperature sensor (not shown), and the signal output from the sensor is sent to the controller 12. The controller 12 controls the heater 13 so that the heating surface 13*a* maintains the predetermined temperature. Note that the temperature of the heating surface 13*a* is determined in advance based on, e.g., the type of sublimation dye 2, the dyeing density, and the material of the plastic lens 3. This temperature is input to the controller 12 via an input device such as a touch panel (not shown).

As the temperature of the heating surface 13*a* reaches the predetermined temperature, the controller 12 drives the lift mechanism 10 to lower the movable stage 7 to a dyeing position shown in FIG. 2. In the process of descending, the movable stage 7 transfers the dyeing substrate 8 to the heating device 6. That is, as the movable stage 7 descends to the level of the heating device 6, the dyeing substrate 8 is mounted on the heating device 6, so the lower surface of the dyeing substrate 8 comes into tight contact with the heating surface 13*a* of the heater 13. After that as well, as the movable stage 7 further descends, the dyeing substrate 8 is mounted on the heating device 6 upon separating from the holding member 11. That is, the dyeing substrate 8 is transferred from the holding member 11 to the heating device 6 so that it is held to be heatable by the heating device 6. The plastic lens 3 then comes close to the dyeing substrate 8. After that, the movable stage 7 stops upon descending to the dyeing position to keep the plastic lens 3 in close proximity to the dyeing substrate 8.

If the interval between the plastic lens 3 and the dyeing substrate 8 is too narrow, the sublimation dye 2 insufficiently disperses, leading to dyeing unevenness. To prevent this, the plastic lens 3 is desirably arranged such that its optical center is spaced apart from the dyeing substrate 8 by at least about 5 mm. The interval between the plastic lens 3 and the dyeing substrate 8 can be adjusted every, for example, 1 mm by controlling the operation of lifting/lowering the movable stage 7. Note that if the interval between the plastic lens 3 and the dyeing substrate 8 is too wide, the sublimation dye 2 unevenly disperses, leading to dyeing unevenness as well as the former case. In addition, it takes a considerable time to obtain a predetermined dyeing density. Hence, the interval between the plastic lens 3 and the dyeing substrate 8 desirably is about 5 to 25 mm.

The sublimation dye 2 sublimates upon being heated through the dyeing substrate 8 by the heating device 6, and forms fine particles, thereby forming a film on the target surface 3*a* of the plastic lens 3 by adhesion and deposition. The heating temperature of the dyeing substrate 8 differs depending on, e.g., the vacuum condition of the vacuum vessel 4, and the materials of the plastic lens 3 and sublimation dye 2, and preferably is about 80° C. to 280° C.

When the sublimation dyeing process ends, the heating device 6 is powered off, and the lift mechanism 10 is driven in a direction opposite to that in the above-mentioned driving to lift the movable stage 7, thereby returning it to the initial position shown in FIG. 1. In the process of ascending, the mounting portion 20 comes into contact with the outer edge of the lower surface of the dyeing substrate 8 and lifts it, thereby receiving the dyeing substrate 8 from the heating device 6. The heating device 6 can be continuously kept ON even after the end of the sublimation dyeing process. Even in this case, the heating of the dyeing substrate 8 stops after the end of the sublimation dyeing process. This is because the movable stage 7 ascends after the end of the sublimation dyeing process, so the dyeing substrate 8 separates from the heating device 6 upward.

After the movable stage 7 ascends and returns to the initial position, the vacuum vessel 4 is opened to remove the holding member 11. In the next process, the sublimation dye 2 applied to the plastic lens 3 penetrates and diffuses into the plastic lens 3 (penetration process).

In this manner, the dyeing apparatus 1 according to the present invention attaches the plastic lens 3 and dyeing substrate 8 to the holding member 11, and lowers the movable stage 7 having the holding member 11. Upon lowering the movable stage 7, the dyeing substrate 8 is transferred to the heating device 6, and the interval between the plastic lens 3 and the dyeing substrate 8 is set to a predetermined interval. Hence, the plastic lens 3 and dyeing substrate 8 can be easily loaded/unloaded, so there is no need to provide, e.g., a special mechanism or means for this operation. This makes it possible to provide an inexpensive, easy-to-use dyeing apparatus.

Also, since the dyeing substrate 8 comes into tight contact with the heating surface 13*a* of the heating device 6, it can be heated to a predetermined temperature in a short time with high heating efficiency. This improves the productivity. The inventor of this invention visually examined the plastic lens 3 dyed using the dyeing apparatus according to this embodiment, and concluded that the sublimation dye 2 was evenly applied over the entire target surface 3*a* of the plastic lens 3 free from any variation.

In the above-described embodiment, the dyeing substrate 8 is heated while being in direct contact with the heating surface 13*a* of the heating device 6. However, the present invention is not particularly limited to this, and the dyeing substrate 8 may be in close proximity to the heating surface 13*a* with a predetermined spacing from it. In this case, the heater 13 is built into the external case 6A such that the heating surface 13*a* of the heater 13 is positioned below the upper surface of the external case 6A. The same effect can also be obtained using another structure in which a support portion which supports the outer edge of the lower surface of the dyeing substrate 8 is provided on the upper surface of the external case 6A. Moreover, the interval between the heater 13 and the dyeing substrate 8 can be adjusted by an interval adjusting device (not shown) provided to the heating device 6. This interval adjusting device can have an arrangement which lifts/lowers the heater 13 under the control of the controller 12.

Also, in the above-described embodiment, the holding member 11 can be separated from the movable stage 7. However, the holding member 11 can also be integrally formed on the movable stage 7. In this case, a holding portion with the same shape as the holding member 11 is provided to the movable stage 7.

Second Embodiment

Figure 4:
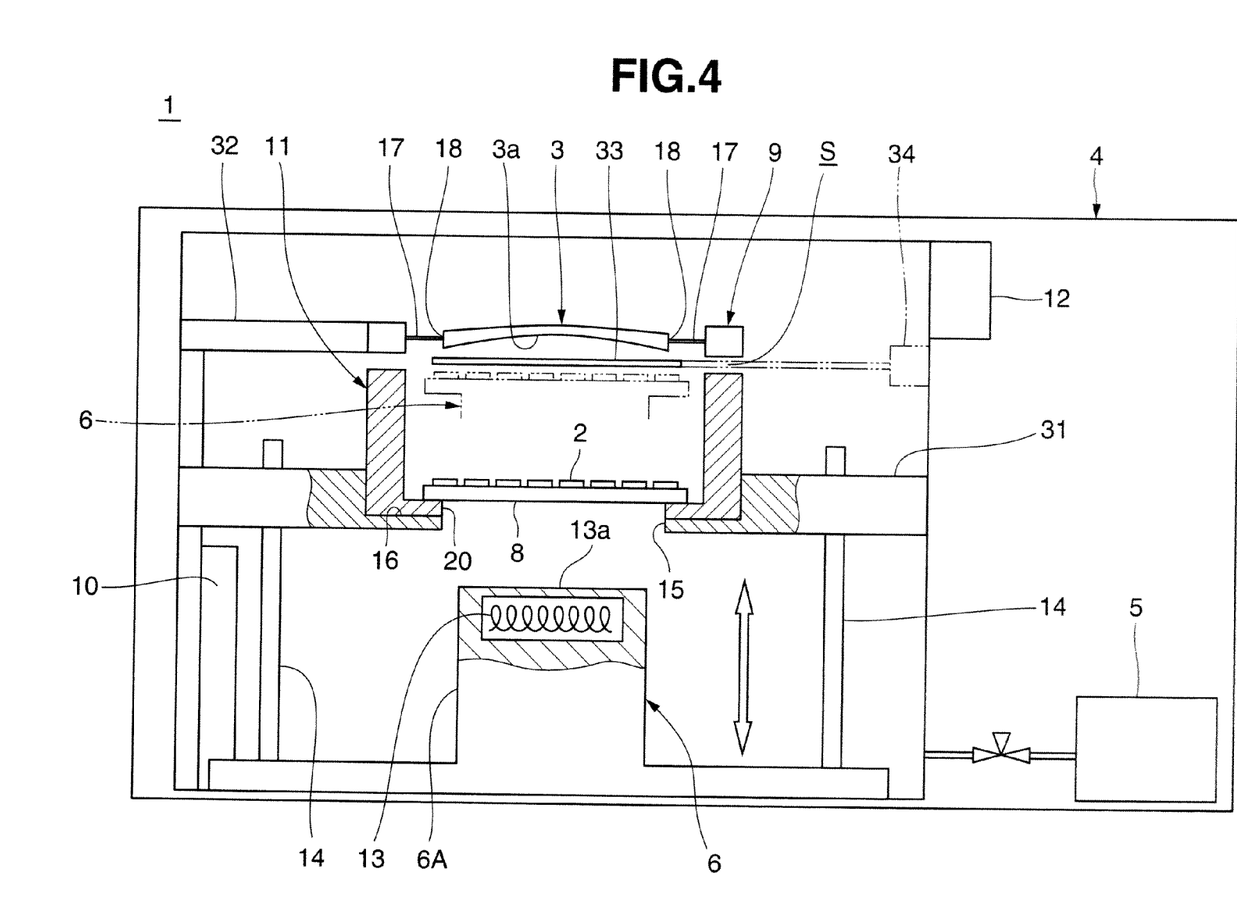
FIG. 4 is a schematic configuration diagram showing another embodiment in which a heating device ascends/descends.

An apparatus for dyeing a plastic lens according to the present invention can be configured, as shown in FIG. 4. The same reference numerals as in FIGS. 1 to 3 denote the same or equivalent members in FIG. 4, and a detailed description thereof will not be given as needed.

A holding member 11 shown in FIG. 4 is supported through a fixed stage 31 in a vacuum vessel 4. The fixed stage 31 is immovably supported in the vacuum vessel 4. A central hole 15 through which a heating device 6 can pass is formed in the fixed stage 31. Also, a recess 16 is formed in the upper surface of a fixed stage 7 to concentrically surround the central hole 15. The recess 16 is formed such that the lower end of the holding member 11 fits into it.

A holder 9 according to this embodiment is immovably supported in the vacuum vessel 4 through a support bracket 32. A space S to pass a shielding plate 33 is formed between the holder 9 and the holding member 11 (between a plastic lens 3 and a dyeing substrate 8). The shielding plate 33 is formed from a metal disk, and supported to be horizontally movable by a driving device 34 provided in the vacuum vessel 4. Upon being driven by the driving device 34, the shielding plate 33 moves between a shielding position where it is positioned below the plastic lens 3, and an open position where it is spaced apart from the plastic lens 3 sideways. The shielding plate 33 according to this embodiment is formed large enough to cover the plastic lens 3 from below while it is inserted between the plastic lens 3 and the dyeing substrate 8.

The heating device 6 according to this embodiment is connected to a lift mechanism 10, and is supported to be vertically movable by guide columns 14. That is, the heating device 6 can vertically move in the vacuum vessel 4 upon being driven by the lift mechanism 10. The heating device 6 according to this embodiment ascends/descends between an initial position indicated by a solid line in FIG. 4, and a dyeing position indicated by a long and two short dashed line in FIG. 4.

As the heating device 6 ascends while the dyeing substrate 8 is held on the holding member 11, a heating surface 13a of the heating device 6 comes into contact with the lower surface of the dyeing substrate 8 from below. As the heating device 6 further ascends, the dyeing substrate 8 is pressed upward from the holding member 11. As the heating device 6 ascends to the dyeing position, the dyeing substrate 8 is opposed to the plastic lens 3 with a spacing between them, which is appropriate for dyeing. A dyeing apparatus 1 with the above-mentioned arrangement performs a sublimation dyeing process when the heating device 6 has thus ascended. After the sublimation dyeing process ends, the heating device 6 stops heating, and descends to the initial position. In the process in which the heating device 6 descends, the dyeing substrate 8 is held on the holding member 11 again. Note that in this embodiment as well, the heating device 6 can keep heating after the sublimation dyeing process ends. Even in this case, the dyeing substrate 8 stops heating after the sublimation dyeing process ends. This is because the heating device 6 descends after the sublimation dyeing process ends, so the dyeing substrate 8 separates from the heating device 6 upward.

The dyeing apparatus 1 according to this embodiment can perform various types of adjustment in the sublimation dyeing process using the shielding plate 33. Dyeing does not take place while the entire region on a target surface 3a of the plastic lens 3 is covered with the shielding plate 33 from below. This makes it possible to adjust the dyeing start time and dyeing end time of the dyeing apparatus 1. Also, the target surface 3a is partially dyed while the target surface 3a of the plastic lens 3 is partially covered with the shielding plate 33 from below. This makes it possible to adjust the range to be dyed in the dyeing apparatus 1.

Third Embodiment

Figure 5:
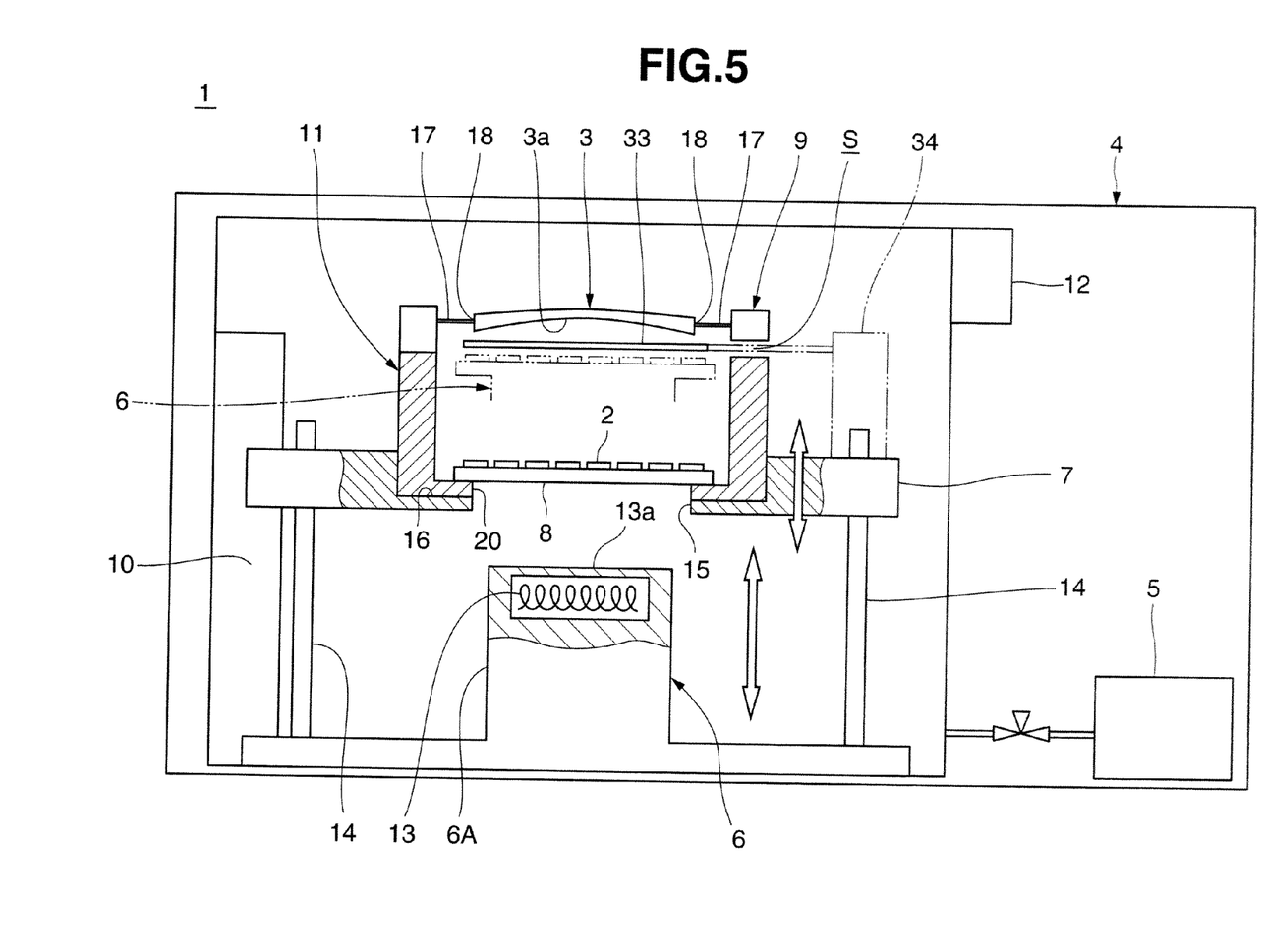
FIG. 5 is a schematic configuration diagram showing still another embodiment in which a holding member and a heating device ascend/descend.

An apparatus for dyeing a plastic lens according to the present invention can be configured, as shown in FIG. 5. The same reference numerals as in FIGS. 1 to 4 denote the same or equivalent members in FIG. 5, and a detailed description thereof will not be given as needed.

A holding member 11 shown in FIG. 5 is connected to a lift mechanism 10 via a movable stage 7, as in the first embodiment. A holder 9 is attached to the upper end of the holding member 11 while a space S which passes through a shielding plate 33 is formed between them. A driving device 34 which drives the shielding plate 33 is supported by the movable stage 7.

A heating device 6 according to this embodiment is connected to the lift mechanism 10, as in the second embodiment, and is supported to be vertically movable by guide columns 14. Although not shown, the lift mechanism 10 according to this embodiment includes a holding member lift unit connected to the holding member 11, and a heating device lift unit connected to the heating device 6. The holding member lift unit and the heating device lift unit operate independently of each other. That is, the holding member 11 vertically moves in a vacuum vessel 4 upon being driven by the holding member lift unit. The heating device 6 vertically moves in the vacuum vessel 4 upon being driven by the heating device lift unit.

A dyeing apparatus 1 according to this embodiment can dye a plastic lens 3 while the plastic lens 3 is positioned at a predetermined level. The predetermined level is determined based on the ambient temperature distribution in the vacuum vessel 4. This temperature distribution can be detected by, for example, a plurality of temperature sensors provided on the inner wall of the vacuum vessel 4. The ambient temperature in the vacuum vessel 4 often changes in correspondence with the level.

In general, sublimation dyeing, including the dyeing method according to this embodiment, starts after the plastic lens 3 is heated to a predetermined temperature in the vacuum vessel 4 in advance. The dyeing apparatus 1 according to this embodiment can change the level of the plastic lens 3 in correspondence with the ambient temperature distribution in the vacuum vessel 4 in heating the plastic lens 3 in advance, as described earlier. If, for example, the plastic lens 3 has a low temperature, it is moved to a position with a relatively high temperature. This makes it possible to shorten the time taken for the heating. In contrast, if the plastic lens 3 has a high temperature, it is moved to a position with a relatively low temperature. This makes it possible to prevent the plastic lens 3 from being excessively heated.

The dyeing apparatus 1 including the shielding plate 33 has been described above in each of the second and third embodiments. However, the dyeing apparatus according to the present invention can include no shielding plate 33.

In the present invention, a dyeing substrate and a plastic lens are held on a holding member. Hence, according to the present invention, it is easy to load/unload the dyeing substrate and the plastic lens. It is also easy to handle the dyeing substrate and the plastic lens.

Also, in the present invention, by vertically moving at least one of the holding member and a heating device, the dyeing substrate is exchanged between the holding member and the heating device, and the plastic lens comes in close proximity to the dyeing substrate. Hence, these members easily assume a dye ready state. The dye ready state means the state in which the dyeing substrate is held to be heatable by the heating device, and the plastic lens is in close proximity to the dyeing substrate. That is, according to the present invention, the dyeing substrate and the plastic lens can easily shift from the state in which they are easy to load/unload to the dye ready state. Hence, according to the present invention, since there is no need to provide, e.g., a special mechanism or means, it is possible to provide a simple apparatus for dyeing a plastic lens.

Moreover, in the present invention, since a sublimation dye is applied to the dyeing substrate in a dot pattern, the dot size can be arbitrarily changed in accordance with the distance from the dyeing substrate to the target surface of the plastic lens. If, for example, the target surface is concaved, this surface is farthest from the dyeing substrate at its central portion, so the dot size is gradually changed in accordance with that distance. This prevents any dyeing unevenness from occurring, and allows gradation (tonal representation).

Moreover, in the present invention, the amount of dye to be applied to the plastic lens can be adjusted by inserting a shielding plate between the plastic lens and the dyeing substrate.

What is claimed is:

1. A method of dyeing a plastic lens, comprising the steps of:
   applying a sublimation dye to a dyeing substrate;
   pre-holding the dyeing substrate on a single holding member which is provided in advance in a vacuum vessel and includes an open end and a mounting portion provided at the open end, the pre-holding step including mounting the dyeing substrate on the mounting portion over the open end;
   holding a plastic lens by the holding member at a position above the dyeing substrate;
   evacuating the vacuum vessel which accommodates the dyeing substrate, the plastic lens and a heating device for heating the dyeing substrate;
   putting an upper side of the heating device in the open end of the holding member and transferring the dyeing substrate from the holding member to the heating device to hold for dying by lowering the holding member or raising the heating device after evacuating the vacuum vessel;
   passing the heating device which holds the dyeing substrate through the open end and bringing the plastic lens in close proximity to the dyeing substrate on the heating device to set an interval for dyeing by further lowering the holding member or further raising the heating device which holds the dyeing substrate after transferring the dyeing substrate; and
   dyeing a target surface of the plastic lens with the sublimation dye sublimated from the dyeing substrate by heating the dyeing substrate using the heating device after setting the interval for dyeing.

2. A method according to claim 1, wherein in the step of applying the sublimation dye to the dyeing substrate, the sublimation dye is applied by dropping to the dyeing substrate in a dot pattern.

3. A method according to claim 1, wherein
   the step of pre-holding the dyeing substrate comprises the step of mounting the dyeing substrate on the holding member, and
   the step of transferring the dyeing substrate comprises the step of mounting the transferred dye substrate on the heating device.

4. A method according to claim 1, further comprising:
   reverse-transferring the dyeing substrate from the heating device to the holding member by lowering the heating device or raising the holding member after dyeing a target surface of the plastic lens; and
   returning the dyeing substrate to the initial position by further lowering the heating device or further raising the holding member which holds the dyeing substrate after reverse-transferring the dyeing substrate.

5. A method of dyeing a plastic lens, comprising the steps of:
   applying a sublimation dye to a dyeing substrate;
   mounting the dyeing substrate on a single holding member which is provided in advance in a vacuum vessel and includes an open end and a mounting portion provided at the open end, the mounting step including mounting the dyeing substrate on the mounting portion over the open end;
   attaching a plastic lens to the holding member at a position above the dyeing substrate by pressing an outer peripheral surface of the plastic lens by pressure holding members;
   evacuating the vacuum vessel which accommodates the dyeing substrate, the plastic lens and a heating device for heating the dyeing substrate;
   putting an upper side of the heating device in the open end of the holding member and transferring the dyeing substrate from the holding member to the heating device to hold for dying by lowering the holding member or raising the heating device after evacuating the vacuum vessel;
   passing the heating device which holds the dyeing substrate through the open end and setting an interval for dyeing between the plastic lens and the dyeing substrate on the heating device by further lowering the holding member or further raising the heating device which holds the dyeing substrate after transferring the dyeing substrate; and
   dyeing a target surface of the plastic lens with the sublimation dye sublimated from the dyeing substrate by heating the dyeing substrate using the heating device after setting the interval for dyeing.

6. A method according to claim 1, further comprising:
   reverse-transferring the dyeing substrate from the heating device to the holding member for holding by lowering the heating device or raising the holding member after dyeing a target surface of the plastic lens; and
   returning the dyeing substrate to the initial position by further lowering the heating device or further raising the holding member which holds the dyeing substrate after reverse-transferring the dyeing substrate.

* * * * *